United States Patent
Guo et al.

(10) Patent No.: US 7,293,220 B2
(45) Date of Patent: Nov. 6, 2007

(54) DATA ACCESSING APPARATUS AND METHOD

(75) Inventors: Dao-Ning Guo, Taipei (TW); Ching-Yu Chen, Taipei (TW); Meng-Huang Chu, Taipei (TW); Pei-Jei Hu, Taipei (TW)

(73) Assignee: Via Technologies, Inc., Taipei (TW)

( * ) Notice: Subject to any disclaimer, the term of this patent is extended or adjusted under 35 U.S.C. 154(b) by 431 days.

(21) Appl. No.: 10/924,952

(22) Filed: Aug. 25, 2004

(65) Prior Publication Data

US 2005/0050431 A1    Mar. 3, 2005

(30) Foreign Application Priority Data

Aug. 26, 2003    (TW)    ............... 92123374 A

(51) Int. Cl.
*G11C 29/00*    (2006.01)
(52) U.S. Cl. .................................... 714/766
(58) Field of Classification Search ................ 714/758, 714/784, 736, 768, 769, 800, 52, 6, 766
See application file for complete search history.

(56) References Cited

U.S. PATENT DOCUMENTS 5,812,564 A *   9/1998   Bonke et al. ............... 714/769
6,574,776 B1 *  6/2003   Chiang ........................ 714/800
6,662,335 B1 * 12/2003   Huang ......................... 714/769
6,721,828 B2 *  4/2004   Verinsky et al. ............. 710/62
6,751,771 B2 *  6/2004   Chuang et al. .............. 714/784

FOREIGN PATENT DOCUMENTS

TW    457474    10/2001

* cited by examiner

*Primary Examiner*—Shelly Chase
*Assistant Examiner*—Fritz Alphonse
(74) *Attorney, Agent, or Firm*—Birch, Stewart, Kolasch & Birch, LLP

(57) ABSTRACT

An apparatus and method for accessing data from a storage medium is disclosed. The apparatus fetches a data block from the storage medium via an accessing unit, and corrects an error of the data block by an error correction code (ECC) decoder according to an ECC of the data block. The apparatus also includes an error detection code (EDC) processor for calculating an EDC of each data sector of the data block, and a flag register for storing a flag associated with each data sector. The method includes re-fetching a data sector if the associated flag indicates the EDC of the data sector is incorrect; and bypassing a data sector if the associated flag indicates that the EDC of the data sector is correct, even though the ECC of the data block indicates that the data sector contains an error.

16 Claims, 6 Drawing Sheets

DATA ACCESSING APPARATUS AND METHOD

This Non-provisional application claims priority under 35 U.S.C. § 119(a) on patent application Ser. No(s). 092123374 filed in Taiwan, Republic of China on Aug. 26, 2003, the entire contents of which are hereby incorporated by reference.

BACKGROUND OF THE INVENTION (a). Field of the Invention

The present invention relates in general to data accessing of a storage medium, and more particularly to a data accessing apparatus and method that can employ a flag to indicate correctness of a data sector fetched from a storage medium of an optical electronic system.

(b). Description of the Prior Arts

Optical disc storage devices are among the most popular computer peripherals in recent years, and their technologies and associated specifications are making progress continuously. The digital video disc (DVD) as a new mainstream specification of optical disc storage is overwhelming and its application is getting more and more popular. Following the massive requirement to upgrade the accessing rate of DVD, it becomes a very important issue to simultaneously improve the accuracy of data accessing and secure an ideal cost/performance (C/P) ratio.

A brief description about the data format of DVD is provided below. First, a DVD data sector is composed of 2064 bytes, and its format is shown as FIG. 1. In FIG. 1, the DVD data sector includes 12 rows, and each row is 172 bytes long. The data sector includes in turn 4 bytes of ID, 2 bytes of ID Error Detection (IED) code, 6 bytes of Copyright Management Information (CPR_MAI), 2048 bytes of main data ($D_0$-$D_{2047}$), and 4 bytes of Error Detection Code (EDC). Wherein, the EDC is encoded in the form of Cyclic Redundancy Check (CRC) and used to detect the correctness of the data sector.

Second, in order to provide better data protection, a DVD data block is composed of 16 data sectors encoded in the form of Reed Solomon Product Code (RSPC), as shown in FIG. 2. In FIG. 2, the DVD data block contains 16 sectors, which total 192 (=12×16) rows and 172 columns, and the outer-code parity (PO) and inner-code parity (PI) data generated by the RSPC encoding. The PO data is generated column by column and 16 bytes long for each column, while the PI data is generated row by row and 10 bytes long for each of the 208 rows (including the 16 rows of PO data). Here the whole data block is processed as an error correction code (ECC) block, and the PO and PI data is the ECC for recovering data errors.

The conventional DVD technology employs the architecture of FIG. 3 to access data from a DVD disc. In FIG. 3, the data on a DVD disc 310 is fetched by a pick-up head 311 and transformed into row data 315 by an analog signal processor 312 and an EFMPLUS demodulator 314. The row data 315 is then stored into a memory 321 via a row data interface 316 by a memory controller 320. When the data stored in the memory 321 can form an ECC data block, a RSPC decoder 317 accesses the data block in the memory 321 by means of the memory controller 320, and decodes the PO and PI data therein to recover data errors. Next, an EDC processor 318 reads the data sectors in the data block and calculates the EDC of each data sector. If all the EDCs are correct, the main data of the data sectors are transferred to a host 322 via a host interface 319. Therefore, in the process of accessing a DVD data block, the PO and PI data corresponding to the data block are first decoded and corrected, and then the EDC of each data sector is verified to assure the correctness of the accessed data.

If any one of the 16 EDCs is incorrect, two common methods are applied. The first one re-performs the whole decoding and verification on the original accessed data block until all the EDCs are correct. The second one re-fetches the data block from the DVD disc, and decodes and verifies the re-fetched block. If there still is any incorrect data sector, the whole process (including re-fetching the block) is repeated until all the EDCs are correct. The above conventional methods have two main drawbacks: one is that the accessing frequency of the memory 321 is too high; the other is that re-fetching or re-decoding of the whole data block is needed to recover the data errors. These drawbacks would impact the DVD data-accessing rate and performance seriously.

R.O.C. Patent No. 88121259, entitled "DVD Data-Accessing Apparatus and Method", provides some improvements for the above issues. Please refer to FIG. 4, which is the block diagram showing the improved apparatus of the patent. First, the data on a DVD disc 410 is fetched by a pick-up head 411 and transformed into row data 415 by an analog signal processor 412 and an EFMPLUS demodulator 414. Then, the improved apparatus decodes the PI data and generates the EDC of each data sector by means of a row data interface and first PI decoder 416, an EDC generator 417 and a row data buffer 418. The row data 415 is then stored into a memory 421. In this way, the load of memory accessing, resulted from the PI decoding and EDC calculation of the conventional technology, can be mitigated. Second, by means of the design of an EDC file 422, an EDC processor 424 and a RSPC decoder 426, the apparatus modifies the previously generated EDCs by using the error correction results at the same time as decoding the PO data and recovering errors. Last, if all the EDCs are correct, then the accessed data is transferred to a host 430 via a host interface 428. Besides, this patent also provides a data accessing method for re-reading a data block if all the EDCs therein are not correct. This method can skip the data sectors verified as correct when re-reading the data block, thereby improving the data-accessing efficiency.

However, the architecture of FIG. 4 needs extra hardware and complex circuits to achieve these improvements. Thus, the chip design is much more difficult, and the chip area and cost are also increased significantly. In view of this, the present invention provides an improved data accessing apparatus and method that can simplify the architecture of FIG. 4 while providing the same performance of data accessing.

SUMMARY OF THE INVENTION

An objective of the present invention is to provide an apparatus and method for accessing data from a storage medium. The storage medium includes a plurality of data blocks, and each of the data blocks includes a plurality of data sectors and an error correction code (ECC) for recovering errors of the corresponding data block. Each of the data sectors includes an error detection code (EDC) for detecting correctness of the corresponding data sector. The apparatus includes an accessing unit for fetching a data block from the storage medium and an ECC decoder coupled to the accessing unit. The ECC decoder corrects an error of the data block according to the ECC of the data block. The apparatus further includes an EDC processor, coupled to the ECC decoder, for calculating the EDC for each data sector of the data block. The apparatus further includes a flag register for storing a flag associated with each data sector. The flag can be updated to indicate correctness of the EDC of the associated data sector.

According to a preferred embodiment of the present invention, the method includes re-fetching a data sector if the associated flag indicates that the EDC of the data sector is incorrect; and bypassing a data sector if the associated flag indicates that the EDC of the data sector is correct, even though the ECC of the data block indicates that the data sector contains an error.

According to a preferred embodiment of the present invention, the flag is implemented by a 1-bit storage element.

DETAILED DESCRIPTION OF THE PREFERRED EMBODIMENT

This section will provide a detailed description with a preferred embodiment and appended drawings to better understand the goals and features of the present invention. The preferred embodiment relates to DVD. However, the present invention is not limited to the DVD embodiment. If a storage medium stores multiple data blocks, each includes multiple data sectors and an ECC for recovering errors, and also if each data sector includes an EDC for detecting correctness of the corresponding one, then the present invention can upgrade data accessing accuracy and performance.

Figure 5:
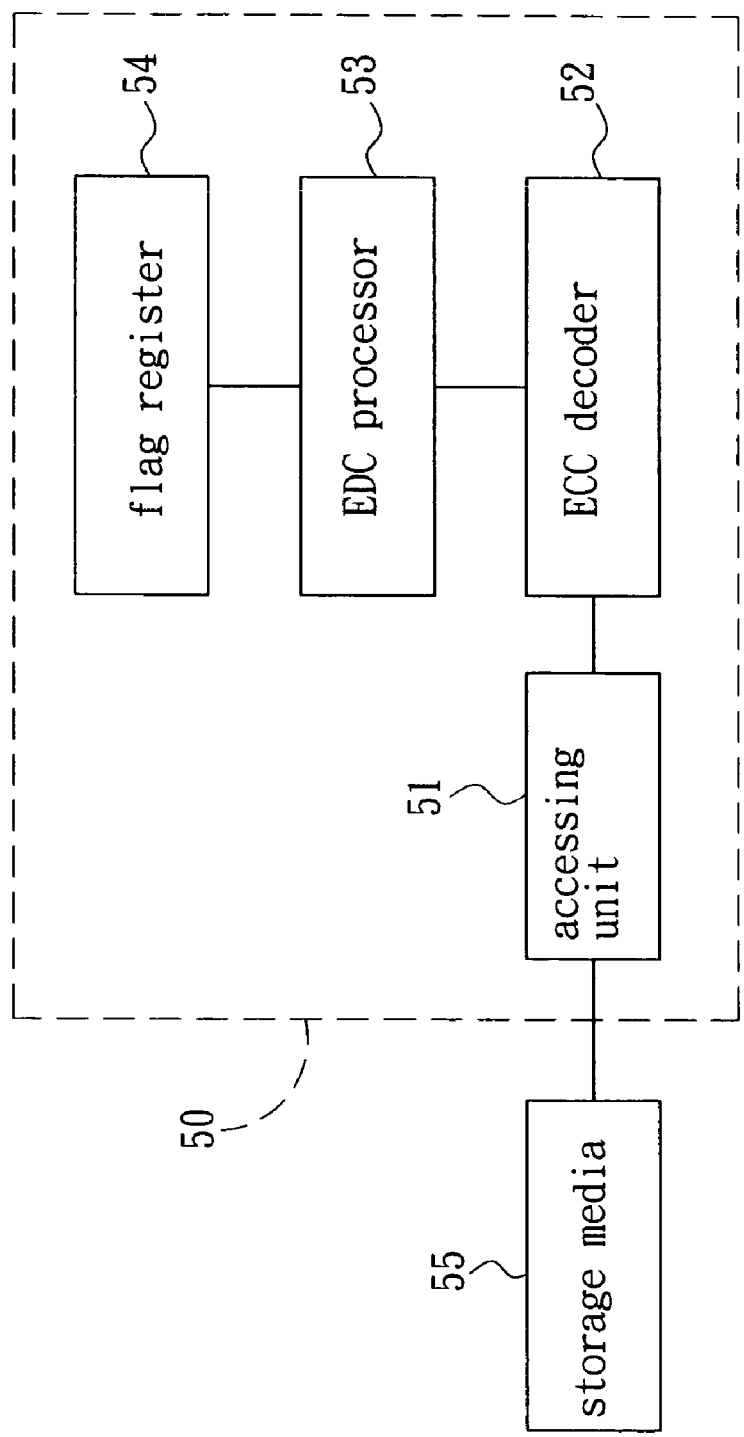
FIG. 5 is a block diagram of a data accessing apparatus according to a preferred embodiment of the present invention.

FIG. 5 is a block diagram of a data accessing apparatus 50 according to the preferred embodiment of the present invention. As shown in FIG. 5, the data accessing apparatus 50 includes an accessing unit 51 for fetching a data block from a storage media 55 and an ECC decoder 52 coupled to the accessing unit 51. The ECC decoder 52 is used to correct an error of the data block according to the ECC of the data block. The data accessing apparatus 50 further includes an EDC processor 53, coupled to the ECC decoder 52, for calculating the EDC for each data sector of the data block. The data accessing apparatus 50 further includes a flag register 54 for storing a flag associated with each data sector. The flag is updated to indicate correctness of the EDC of the associated data sector.

Compared to the prior arts, the preferred embodiment of FIG. 5 can effectively reduce hardware components and space required. More specifically, when the data accessing apparatus 50 needs to re-fetch a data block since the data block contains an incorrect data sector, the apparatus 50 just re-fetches the incorrect data sector and bypass correct ones according to indications of the flags in the flag register 54. In this way, the time of re-fetching is reduced, and the correct data sectors are also protected from alteration.

Figure 1:
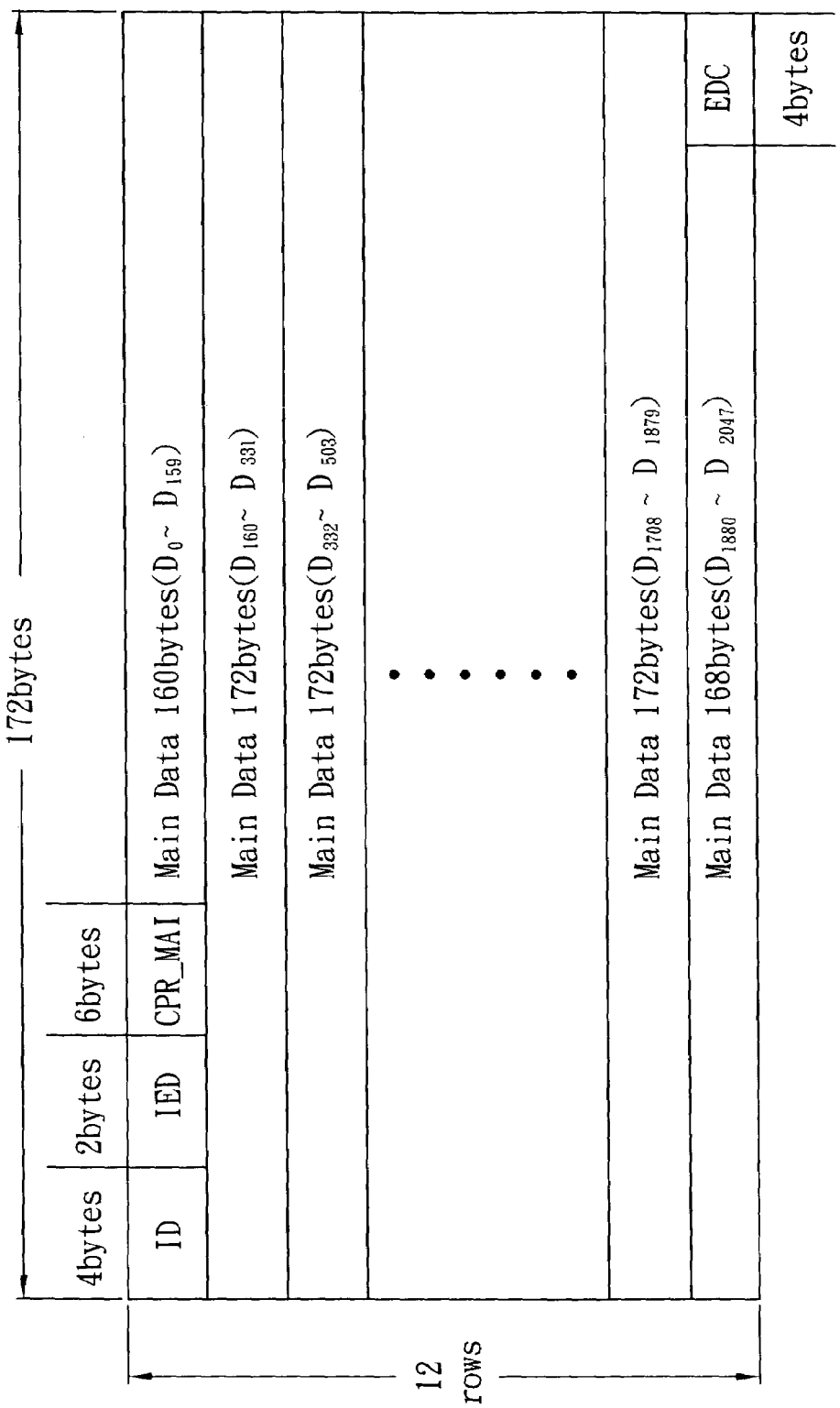
FIG. 1 is a diagram depicting the format of a DVD data sector.
Figure 2:
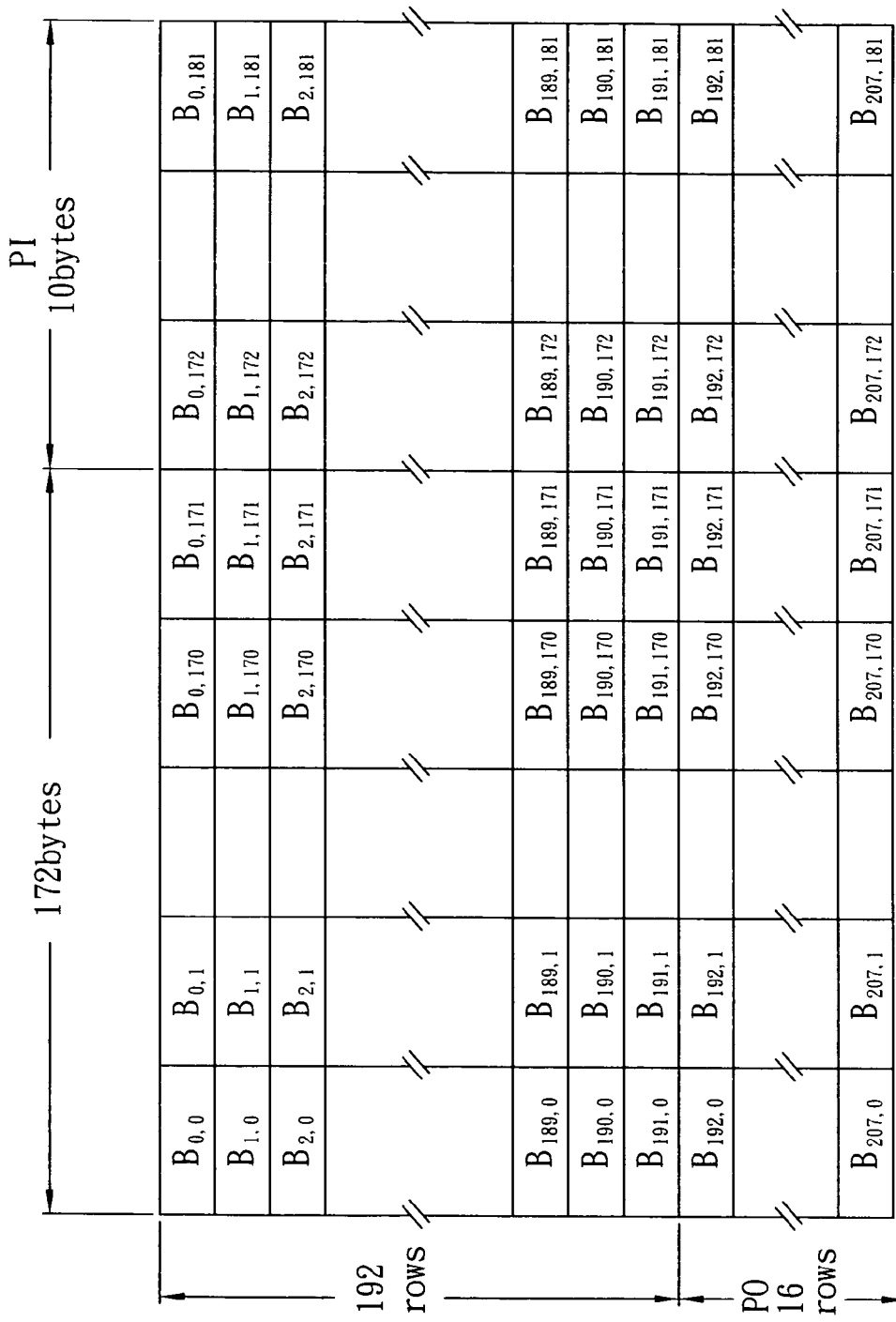
FIG. 2 is a diagram depicting the format of a DVD data block.
Figure 3:
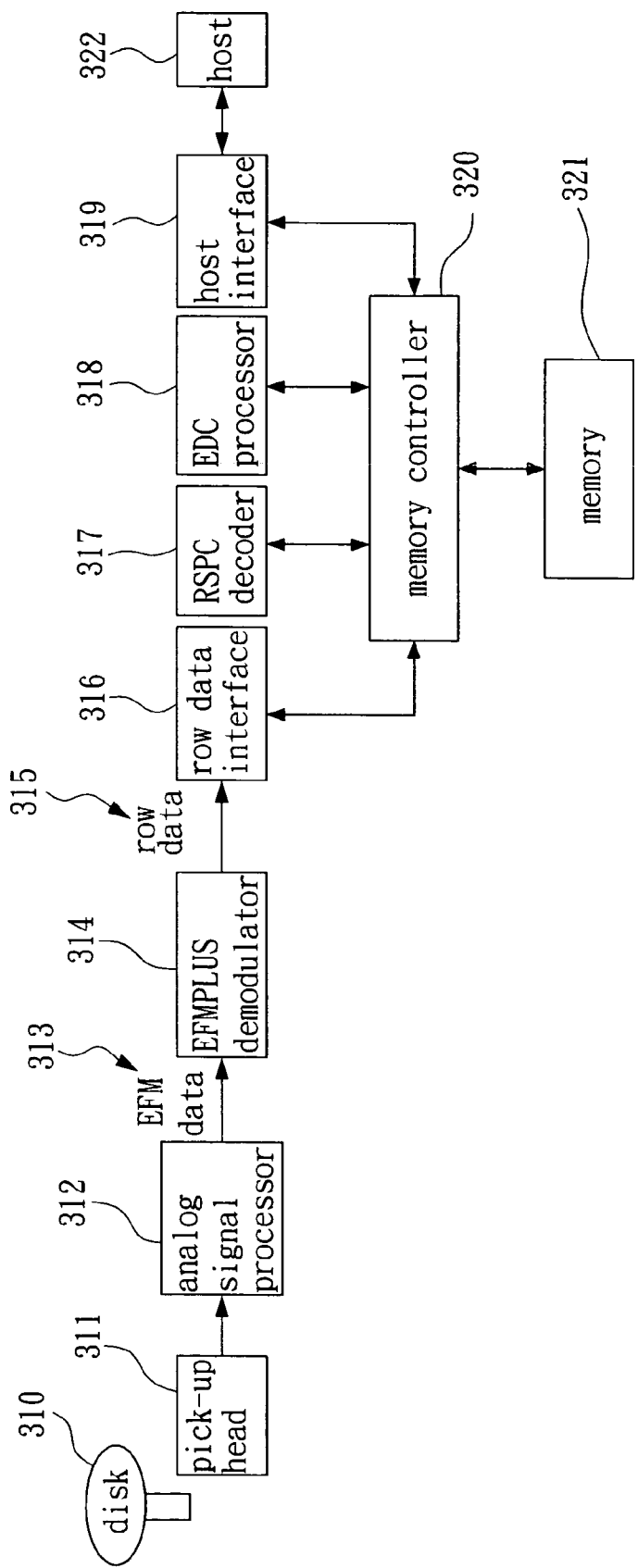
FIG. 3 is a block diagram of a conventional data accessing architecture.
Figure 4:
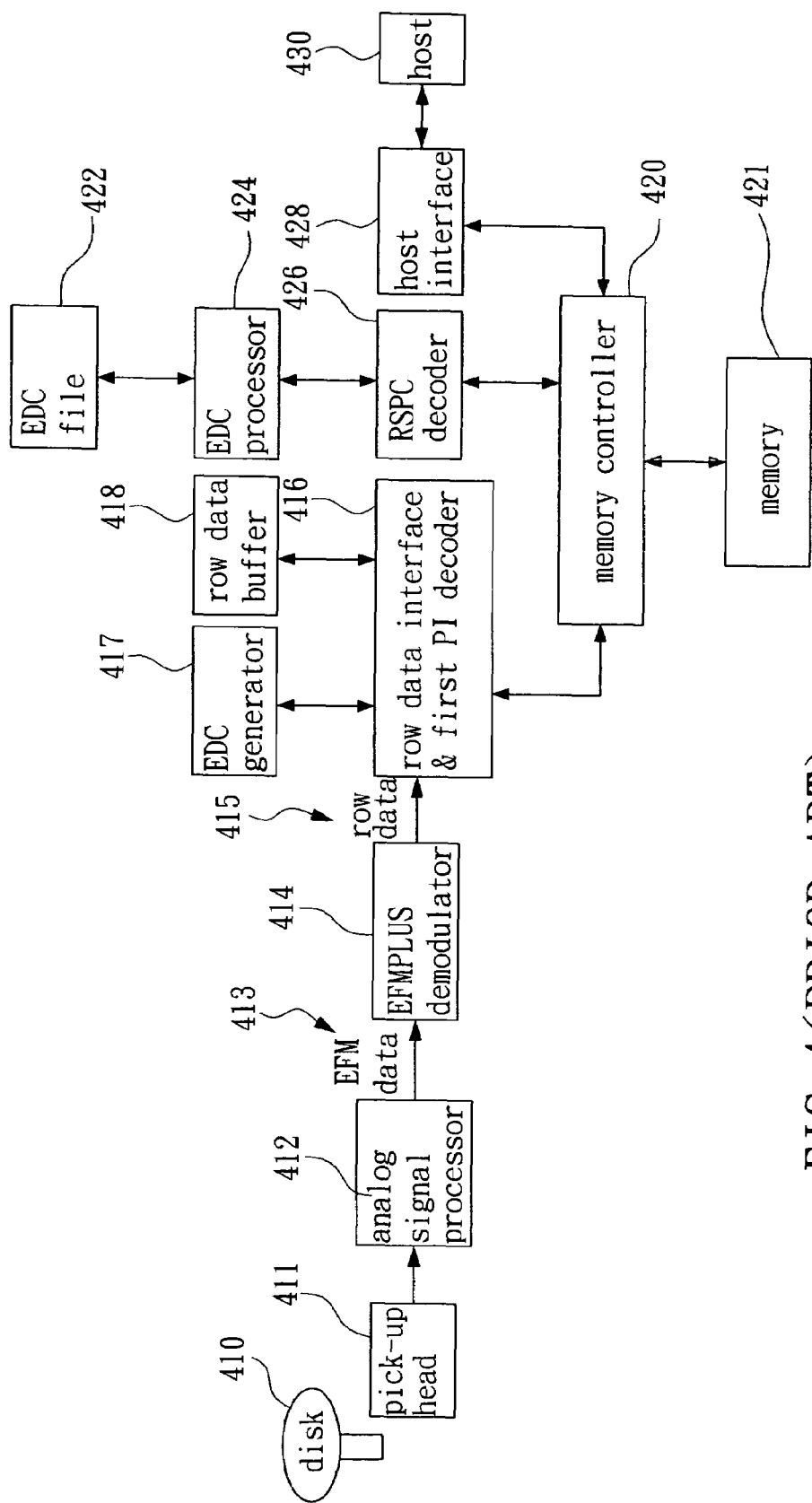
FIG. 4 is a block diagram of an improved data accessing architecture.

As mentioned above, a DVD data sector is composed of 2064 bytes in the format of FIG. 1, where a 4-byte EDC is included for detecting correctness of the DVD data sector. Furthermore, an ECC data block is composed of 16 DVD data sectors along with the RSPC-encoded data, as shown in FIG. 2, where the RSPC-encoded data (PI & PO) is used to recover data errors. Therefore, the data accessing apparatus of FIG. 5 can be applied to upgrade DVD data accessing performance.

Figure 6:
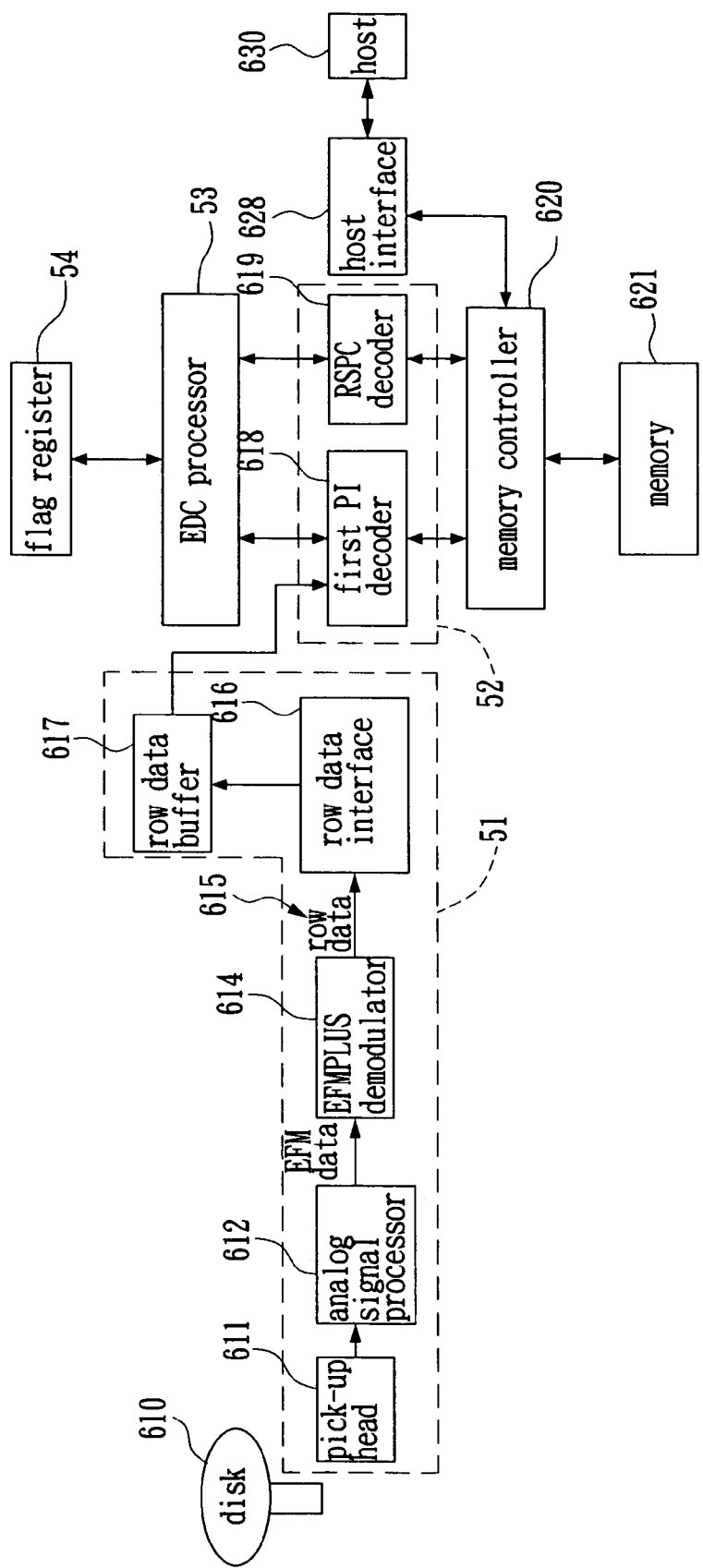
FIG. 6 is a block diagram of a hardware architecture for DVD data accessing according to a preferred embodiment of the present invention.

FIG. 6 is a block diagram of a hardware architecture for DVD data accessing according to the preferred embodiment of the present invention. In FIG. 6, the accessing unit 51 includes a pick-up head 611 for fetching data from a DVD disc 610, and an analog signal processor 612 and an EFM-PLUS demodulator 614 for transforming the fetched data into row data 615. The accessing unit 51 further includes a row data interface 616 and a row data buffer 617, which can buffer the row data 615 generated by the EFMPLUS demodulator 614 for subsequent decoding and error correction.

As shown in FIG. 6, the ECC decoder 52 includes a first PI decoder 618 and a RSPC decoder 619. When a row of data (including PI data) is formed in the row data buffer 617, it is provided to the first PI decoder 618 for PI decoding, and the decoding result is stored into a memory 621 via a memory controller 620 in FIG. 6. On the other hand, if the decoding result is necessary for generating the EDC of a data sector, then the decoding result is also provided to the EDC processor 53 of FIG. 6 for calculating the EDC of the data sector. In this manner, when a whole data sector is stored into the memory 621, the EDC processor also completes the EDC calculation. Then, the calculated EDC is used to determine correctness of the data sector, and the result of the determination is represented as a flag and stored into the flag register 54 for subsequent processing. In the embodiment of FIG. 6, the flag is one bit long, and a logic one/zero of the flag represents that the associated data sector is correct/incorrect.

After a whole data block is fetched by the accessing unit 51 and stored into the memory 621, the RSPC decoder 619 reads each column of the data block (including PO data) from the memory 621 via the memory controller 620 and performs the PO decoding thereon. When an error is found in a certain column, the error is corrected and the corrected column is stored back into the memory 621. Meanwhile if the EDC of the data sector containing the error of the certain column is incorrect (i.e. the associated flag in the flag register 54 is a logic zero), the result of the correction is provided to the EDC processor 53 for calculating the EDC again. When the PO decoding is performed for a whole data sector, the EDC processor also completes the EDC re-calculation to determine whether the data sector is correct, and the associated flag is updated according to the result of the determination. It should be noted that if the RSPC decoder 619 finds an error in some data sector while the EDC of the data sector is correct, the PO decoding outcome is ignored to avoid modifying the data which is originally correct.

After the RSPC decoder 619 decodes all the PO data of the data block, it is determined whether all the data sectors of the data block are correct by checking the flags stored in the flag register 54. If so, then a host interface 628 transfers the data block in the memory 621 to a host 630 via the memory controller 620.

It is noted that the present invention can be applied to an optical electronic system with data-accessing capability, such as CD-ROM drive, DVD-ROM drive, DVD player, DVD±RW drives, etc., to assure the data accuracy.

While the present invention has been shown and described with reference to two preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. An apparatus for accessing data from a storage medium comprising at least one data block, wherein the data block comprises a plurality of data sectors and an error correction code (ECC), and each of the data sectors comprises an error detection code (EDC), the apparatus comprising:
   an accessing unit for fetching the data block from the storage medium;
   an ECC decoder, coupled to the accessing unit, for correcting an error of the data block according to the ECC of the data block;
   an EDC processor, coupled to the ECC decoder, for calculating the EDC for each of the data sectors of the data block; and
   a flag register for storing a flag associated with each of the data sectors of the data block, wherein the flag indicates correctness of the EDC of the associated data sector,
   wherein when the flag indicates that the EDC of the associated data sector is incorrect, the associated data sector is re-fetched,
   wherein when the flag indicates that the EDC of the associated data sector is correct, the associated data sector is bypassed if the data block is re-fetched,
   wherein when the flag indicates that the EDC of the associated data sector is correct and the ECC indicates that the associated data sector contains an error, the associated data sector is prevented from error correction of the ECC decoder.

2. The apparatus of claim 1, wherein the storage medium can be accessed by one of a CD-ROM drive, a DVD-ROM drive, a DVD player and a DVD±RW drive.

3. The apparatus of claim 1, wherein the ECC comprises outer-code parity (PO) data and inner-code parity (PI) data encoded in a form of Reed Solomon Product Code (RSPC).

4. The apparatus of claim 1, wherein the flag is one bit long.

5. The apparatus of claim 1, wherein when the flags indicate that the EDCs of all the data sectors of the data block are correct, the data block is transferred to a host.

6. A data accessing apparatus in an optical electronic system, comprising:
   an error correction code (ECC) decoder for recovering an error of a data block according to an ECC of the data block;
   an error detection code (EDC) processor, coupled to the ECC decoder, for calculating an EDC for each of a plurality of data sectors of the data block; and
   a flag register for storing a flag associated with each of the data sectors, wherein the flag indicates correctness of the EDC of the associated data sector,
   wherein when the flag indicates that the EDC of the associated data sector is incorrect, the associated data sector is re-fetched,
   wherein when the flag indicates that the EDC of the associated data sector is correct, the associated data sector is bypassed if the data block is re-fetched,
   wherein when the flag indicates that the EDC of the associated data sector is correct and the ECC indicates that the associated data sector contains an error, the associated data sector is prevented from error correction of the ECC decoder.

7. The data accessing apparatus of claim 6, wherein the optical electronic system comprises one of a CD-ROM drive, a DVD-ROM drive, a DVD player and a DVD±RW drive.

8. The data accessing apparatus of claim 6, wherein the ECC comprises outer-code parity (PO) data and inner-code parity (PI) data encoded in a form of Reed Solomon Product Code (RSPC).

9. The data accessing apparatus of claim 6, wherein the flag is one bit long.

10. The data accessing apparatus of claim 6, wherein when the flags indicate that the EDCs of all the data sectors of the data block are correct, the data block is transferred to a host coupled to the optical electronic system.

11. The data accessing apparatus of claim 6, further comprising an accessing unit for fetching the data block from a storage medium of the optical electronic system.

12. A data accessing method in an optical electronic system, comprising:
   correcting an error of a data block according to an error correction code (ECC) of the data block, wherein the data block is fetched from a storage medium of the optical electronic system and comprises a plurality of data sectors;
   calculating an error detection code (EDC) for each of the data sectors;
   storing a flag associated with each of the data sectors, wherein the flag indicates correctness of the EDC of the associated data sector;
   re-fetching the data block when at least one of the flags indicates that the EDC of the associated data sector is incorrect, wherein the re-fetching step comprises:
      re-fetching the data sector with an incorrect EDC, and bypassing the data sector with a correct EDC; and
   preventing the associated data sector from error correction when the flag indicates that the EDC of the associated data sector is correct and the ECC indicates that the associated data sector contains an error.

13. The data accessing method of claim 12, wherein the optical electronic system comprises one of a CD-ROM drive, a DVD-ROM drive, a DVD player and a DVD±RW drive.

14. The data accessing method of claim 12, wherein the ECC comprises outer-code parity (PO) data and inner-code parity (PI) data encoded in a form of Reed Solomon Product Code (RSPC).

15. The data accessing method of claim 12, further comprising:
   transferring the data block to a host coupled to the optical electronic system when the flags indicate that the EDCs of all the data sectors of the data block are correct.

16. The data accessing method of claim 12, wherein the flag is one bit long.

* * * * *